Figure 1:
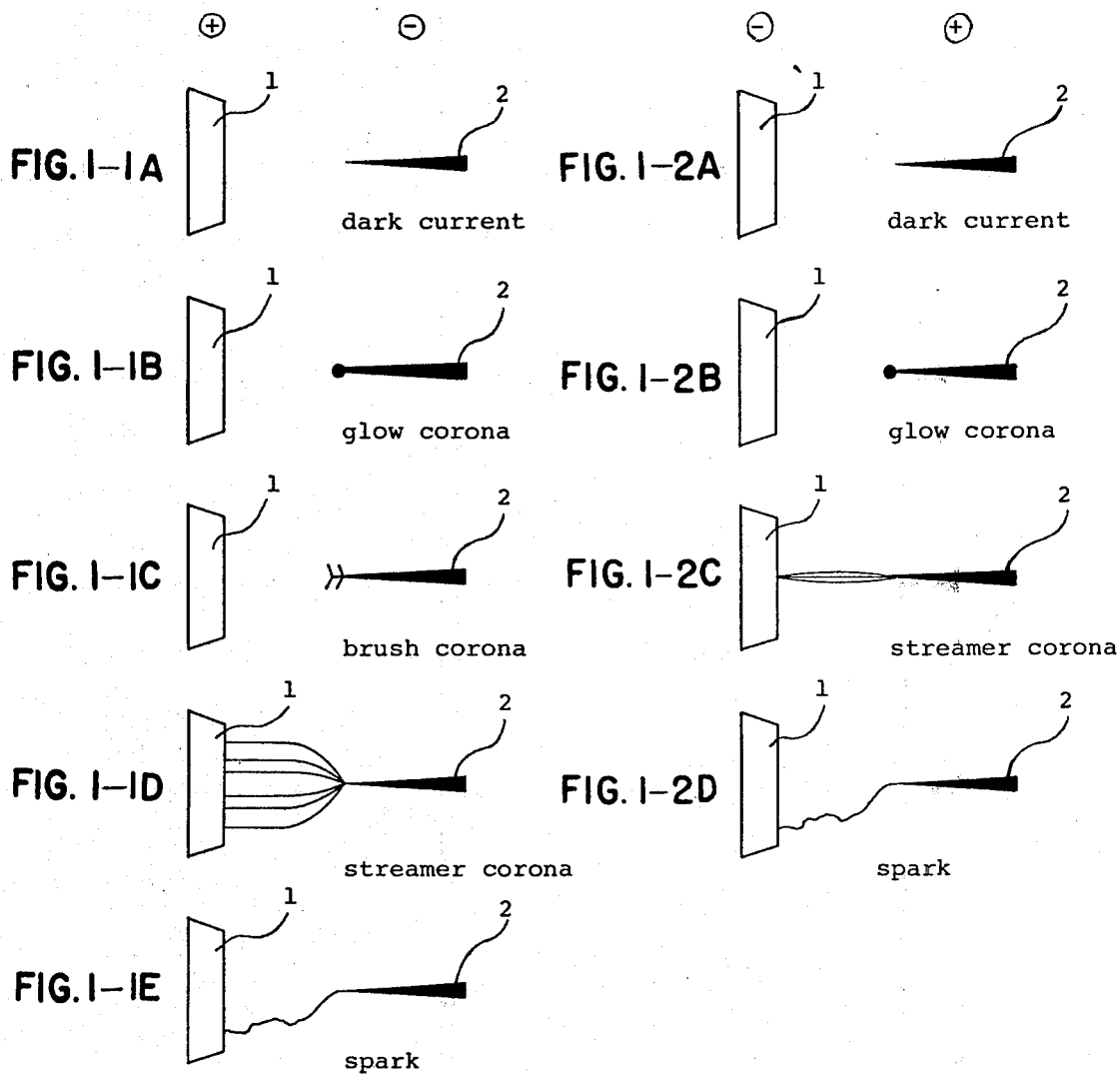

United States Patent [19]

Yoshino et al.

[11] 4,268,464
[45] May 19, 1981

[54] ELECTROSTATIC PINNING OF EXTRUDED POLYAMIDE FILM

[75] Inventors: Yasutomi Yoshino; Fumio Nishimura; Haruhiko Watanabe; Masahiro Kobayashi; Kunio Takeuchi; Haruo Okudaira, all of Inuyama, Japan

[73] Assignee: Toyo Boseki Kabushiki Kaisha, Japan

[21] Appl. No.: 67,485

[22] Filed: Aug. 16, 1979

[51] Int. Cl.³ .......................... B29D 7/02; B29D 7/24
[52] U.S. Cl. ........................................ 264/22; 264/28; 425/174.8 E
[58] Field of Search ............... 264/22, 28, 216, 176 R, 264/210.6; 425/174.8 E

[56] References Cited

U.S. PATENT DOCUMENTS

| | | | |
|---|---|---|---|
| 3,223,757 | 12/1965 | Owens et al. | 264/22 |
| 3,361,728 | 1/1968 | Coen et al. | 264/216 |
| 3,427,686 | 2/1969 | Busby | 425/174.8 E |
| 3,655,307 | 4/1972 | Hawkins | 264/22 |
| 4,111,625 | 9/1978 | Remmington et al. | 425/174.8 E |

FOREIGN PATENT DOCUMENTS 51-41762  4/1976  Japan .................................. 264/22

Primary Examiner—James B. Lowe
Attorney, Agent, or Firm—Jones, Tullar & Cooper

[57] ABSTRACT

A process for production of a sheet of a polyamide material which comprises extruding the polyamide material in a melt state in the form of sheet and bringing the extruded sheet in a melt state into contact with the surface of a moving chill body for quenching to give an undrawn film, characterized in that a direct current of high voltage is applied between an electrode and the extruded sheet so as to product a discharge in a streamer corona state onto the extruded sheet, whereby the extruded sheet is brought into tight and close contact with the surface of the moving chill body electrically grounded so as to be chilled quickly.

12 Claims, 10 Drawing Figures

ELECTROSTATIC PINNING OF EXTRUDED POLYAMIDE FILM

The present invention relates to production of a polyamide material sheet. More particularly, it relates to the production of undrawn and drawn sheets of a thermoplastic polyamide material having excellent physical and chemical properties with a high speed.

Hitherto, a sheet of a thermoplastic polyamide material has been prepared by extruding the thermoplastic polyamide material in a melt state in the form of sheet and bring the extruded sheet in a melt state into contact with the surface of a moving chill body for quenching. In such method, a thin layer of air is apt to be introduced between the extruded sheet in a melt state and the surface of the moving chill body, whereby heat transference is lowered. Thus, the extruded sheet is chilled at a lowered rate, and crystallization proceeds to a certain extent in the extruded sheet while chilling. As the result, the obtained sheet has a high crystallinity and is inferior in transparency. Further, the oligomers produced from the extruded sheet in a melt state are carried on by the said thin layer of air and accumulated on the surface of the moving chill body, whereby the chilling effect is considerably deteriorated and also the irregularity in haze is produced in the chilled sheet.

Since it is expected that if the tight and close contact between the extruded sheet and the surface of the moving chill body without intervention of the thin layer of air is assured, the extruded sheet would be quickly chilled and the chilled sheet would have a low crystallinity, attempts have been made for realization of the said tight and close contact. One of such attempts is to use electrostatic attraction apparatuses. For instance, there is proposed a process for chilling quickly an extruded sheet of a thermoplastic polymeric material in a melt state wherein a wire-like or knife edge-like electrode is provided between a die and a moving chill body to produce an electrostatic charge on the extruded sheet, whereby the tight and close contact of the extruded sheet on the surface of the moving chill body is assured (this conventional process being hereinafter referred to as "electrostatic pinning procedure") (U.S. Pat. No. 3,223,757). In this conventional process, however, the tight and close contact is possible only when the take-up speed of the extruded sheet is slow. When the take-up speed is made rapid, the tight and close contact becomes hardly possible and the improving effect is lost. In order to make large the quantity of the electrostatic charge to be produced on the surface of the extruded sheet, the elevation of the voltage was proposed, but in this case, discontinuous arc discharge is produced between the electrode and the surface of the moving chill body, which leads to breakage of the extruded sheet on the moving chill body. Thus, the elevation of the voltage over a certain limit is not permissible, and therefore it is impossible to produce a sheet of good quality with a high speed by the electrostatic pinning procedure.

As the result of an extensive study, it has now been found that the application of a direct current of high voltage between an electrode and an extruded sheet to produce discharge in a streamer corona state onto the extruded sheet makes assure the tight and close contact between the extruded sheet and the surface of a moving chill body. Even when the take-up speed is sufficiently high, the tight and close contact is satisfactorily assured. Accordingly, it is quite possible to produce a sheet of a polyamide material having an even thickness, a good transparency, a low crystallinity and a less irregularity of haze with a high speed. Advantageously, accumulation of oligomers on the surface of a moving chill body is not seen.

Further, the above extruded and chilled sheet can be drawn at least in one direction to give a drawn sheet having a uniform thickness, an excellent transparency and a good orientation. It is particularly notable that sequential biaxial drawing is applicable to the said extruded and chilled sheet without any difficulty, because it is commonly known that polyamides are subjected to sequential biaxial drawing with great difficulty due to the strong intermolecular hydrogen bonding in the crystalline portion.

According to the present invention, there is provided a process for production of a sheet of a polyamide material which comprises extruding the polyamide material in a melt state in the form of sheet and bringing the extruded sheet in a melt state into contact with the surface of a moving chill body for quenching to give an undrawn film, characterized in that a direct current of high voltage is applied between an electrode and the extruded sheet so as to produce a discharge in a streamer corona state onto the extruded sheet, whereby the extruded sheet is brought into tight and close contact with the surface of the moving chill body electrically grounded so as to be chilled quickly.

Throughout the specification, the term "polyamide material" is intended to mean a polyamide itself and a blend comprising a polyamide as the major component. In the blend, there may be included, in addition to a polyamide as the major component, any other polymeric material as well as conventional additives. Examples of the polyamide are aliphatic polyamides (e.g. nylon 6, nylon 66, nylon 11, nylon 12), alicyclic polyamides, aromatic polyamides (e.g. condensates of aliphatic diamines and terephthalic and/or isophthalic acids, condensates of aliphatic dicarboxylic acids and xylylene diamines), etc.

As the other polymeric materials, there may be used polyesters (e.g. polycarbonates, polyethylene terephthalate, polytetramethylene terephthalate, poly-1,4-cyclohexane terephthalate, polyethylene-2,6-dinaphthalate, copolymer of terephthalic acid with neopentyl glycol), polyolefins (e.g. polypropylene, polyethylene, ionomers, ethylene-vinyl acetate copolymer, partially saponified ethylene-vinyl acetate copolymer, ethylene-ethyl acrylate copolymer, polyvinyl alcohol), modified polyolefins obtained by graft polymerizing maleic anhydride onto polyolefins, polyalkylene glycols having an average molecular weight of 200 to 10,000, etc. When used, their amount may be usually less than an equal weight to the polyamide, preferably not more than 20% by weight to the polyamide, provided that their incorporation does not substantially afford any influence on the transparency of a sheet prepared from the resulting blend.

As the conventional additives, there are exemplified lubricants, anti-oxidants, ultraviolet ray absorbers, antistatic agents, pigments, coloring agents, etc. These additives are employed for the purpose of improving such physical and/or chemical properties of the resulting blend or a sheet prepared therefrom as lubricity, antiblocking property, draw property, thermal resistance, antistatic property or the like. Examples of the lubricant are organic lubricants such as ethylene bis(stearoamide), stearyl monoglyceride and 1,5-sorbitan aliphatic ester, inorganic lubricants such as calcium carbonate, kaolin, talc, clay, silicon dioxide and calcium sulfate, etc. The average particle size of the inorganic lubricants may be usually from 0.01 to 10 microns. When used, the amount of the lubricant is preferably from 0.01 to 10% by weight on the basis of the amount of the polyamide and, if incorporated, the other polymeric material.

According to the process of the present invention, the polyamide material is extruded in a melt state to make a sheet (or a film). Extrusion may be carried out by the use of a flat die such as T-die or I-die. The extruded product is quenched on the surface of a moving chill body such as a chill roll or a chill belt, whereby a substantially unoriented sheet is obtained. In order to prevent the crystallization in the extruded sheet, the temperature for chilling is kept between 0° C. (preferably the dew point) and a temperature of 20° C. lower than the maximum temperature for crystallization (Tc), particularly between 0° C. and the glass transition point (Tg).

The said maximum temperature for crystallization can be measured by the use of a differential scanning calorimeter (D.S.C.). It is varied with the kind of the polymer, the additive incorporated therein, etc. In case of nylon 6, the maximum temperature for crystallization is normally 180° to 200° C. When the chilling temperature is higher than (Tg+10° C.), the resulting chilled sheet is apt to be deformed. Therefore, further chilling at the second stage at a temperature below (Tg+10° C.) is recommended. Chilling of the extruded sheet is mainly achieved by the contact onto the surface of a moving chill body but any other cooling measure such as application of a cold liquid or a cooling gas to the sheet from the opposite side to the existence of the moving chill body may be supplementarily adopted.

The surface of the moving chill body may be planished or roughened. It may be made of any electroconductive material such as a metallic material (e.g. hard chrome, stainless steel, nickel).

As a characteristic feature in the process of this invention, a corona discharge in a streamer corona state is produced onto the extruded sheet of the polyamide material before its contact onto the moving chill body by application of a direct electric current of high voltage between an electrode and the extruded sheet. The electrode may be present on any side, i.e. the side of the moving chill body or the side opposite thereto, to the extruded sheet. As the result of such production of corona discharge, an electric current of several times that in the said conventional electrostatic pinning procedure is applied to the extruded sheet of the polyamide material so that its contact onto the surface of the moving chill body in a highly close and tight state can be assured.

Figure 2:
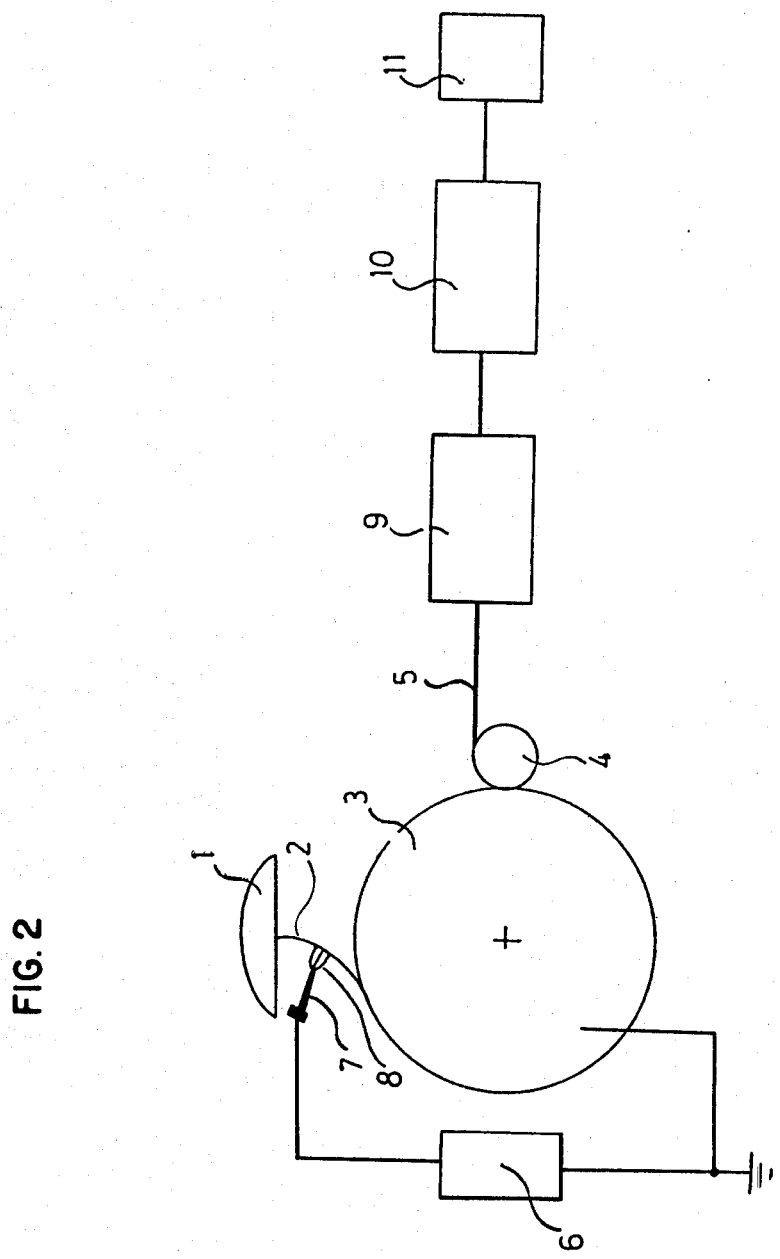

The corona discharge in a streamer corona state indicates a stable corona state bridging the electrode and the extruded sheet as shown in FIG. 2.4 on page 73 of S. Sakamoto and H. Tagashira: "New High Voltage Technology" published by Asakura Shoten K.K. in 1974. When the electrode is in a positive potential, the produced corona is concentrated onto the extruded sheet from the terminal end of the electrode in a rod-like state. When the electrode is in a negative potential, the produced corona spreads onto the extruded sheet from the terminal end of the electrode in a bell-like state. Both may be considered to be within the category of the corona discharge in a streamer corona state.

In general, the kinds of corona discharge are as shown in FIGS. 1-1 and 1-2 of the accompanying drawings, wherein 1 is the polyamide material in a melt state and 2 is an electrode. As shown in FIG. 1-1 wherein the electrode is set as a negative electrode, elevation of the voltage affords discharge of (A) dark current, (B) glow corona, (C) brush corona, (D) streamer corona and (E) spark in order. The polyamide in a melt state is earthed through the moving chill body. When the electrode is set as a positive electrode, elevation of the voltage affords, as shown in FIG. 1-2, discharge of (A) dark current, (B) glow corona, (C) streamer corona and (D) spark in order.

The corona discharge in a streamer corona can be produced in a current of 10 mA to 5 A, preferably of 20 mA to 500 mA, per 1 m of the width of the sheet when the take-up speed is 10 to 200 m/min. At a higher take-up speed, a higher current is favorable. The tightness of the contact of the extruded sheet onto the surface of the moving chill body is substantially decided on the current and is not much influenced by the voltage. With a longer distance between the electrode and the extruded sheet, higher is the voltage, which is usually from 0.5 to 20 KV.

Although the direct current of high voltage to be used in the present invention may be somewhat added with an alternative current, the use of a source of direct current of which the voltage or current are stabilized as far as possible, particularly of a direct current source having a ripple of not more than 1.0% (peak to peak) when measured with a dummy resistance connected to the output and the earth terminal, is favored. The electrode may be either of positive potential or of negative potential but the latter is preferred.

For stable production of discharge in a streamer corona state, it is favorable to arrange discharge points discontinuously. Thus, the use of a needle-like electrode, a sawtooth-like electrode, a wire-like electrode, a knife edge-like electrode, etc. having multiple projections or corners in the transverse direction is preferred. The discharge body of the electrode may be made of any electroconductive material such as a metal or carbon.

In order to produce discharge in a streamer corona state stably, it is recommended to set a gap of not more than 20 mm, preferably of 0.1 to 10 mm, between the discharge point of the electrode and the extruded sheet. When the discharge point is set with such gap, a brilliant discharge in a streamer corona state is stably produced between the electrode and the extruded sheet. Simultaneously, a high electric current flows.

It is notable that the process of this invention is characteristically applicable to a sheet of the polyamide material. When the sheet is made of any other polymeric material, for instance, polypropylene or polyethylene terephthalate, a stabilized discharge in a streamer corona state is not necessarily produced, and discharge in a brush corona state is usually transferred to the one in a spark state without producing any discharge in a streamer corona state in case of elevating the voltage.

The thickness of the extruded sheet of the polyamide material is not limitative and may be usually from 10 microns to 3 mm, preferably from 50 microns to 1 mm.

The take-up speed of the extruded sheet is also not limitative. But, it may be noted that such a high take-up speed as 100 to 200 m/min, which can never be adopted in the said conventional electrostatic pinning procedure where the normal take-up speed is 10 to 20 m/min, is still applicable in the process of the invention. Thus, a take-up speed of 100 to 200 m/min or less may be adopted.

On the contact of the extruded sheet to the surface of the moving chill body, the ratio of the natural flow rate of the extruded sheet to the surface moving rate of the moving chill body may be not less than 1.0, preferably from 1.0 to 120.

According to the process of this invention, there can be manufactured a sheet of the polyamide material having an even thickness, a low crystallinity, a high transparency and a less irregularity in haze with a high speed. No stain due to oligomers is observed on the surface of the moving chill body.

For manufacture of a drawn sheet (or film) of the polyamide material, the undrawn sheet as prepared above is drawn not less than 1.1 folds, preferably 1.1 to 8 folds, at least in a uniaxial direction. In case of biaxial drawing, the undrawn sheet may be drawn 1.1 to 6 folds in each of biaxial directions. Normally, the drawing in a machine direction (MD) is achieved by drawing the undrawn sheet using not less than two sets of rolls having different rotation speeds or using not less than one set of pressing rolls. The drawing in a transverse direction (TD) is accomplished in a tenter. The once uniaxially drawn film may be further drawn in the same or different direction. Alternatively, biaxial drawing may be effected simultaneously. In case of simultaneous multi-axial drawing, the drawing may be effected in a tenter for simultaneous biaxial drawing or by shaping in a mold.

The temperature for drawing may be usually from a temperature of (Tg−10° C.) to a temperature of (M.P.−10° C.), preferably from a temperature of (Tg+5° C.) to a temperature of (M.P.−20° C.). (Tg is a glass transition point, and M.P. is a melting point). The drawing speed may be usually not less than 100%/min, preferably from 300 to 2,000,000%/min. The thickness of the drawn sheet is not limitative and may be usually not less than 2 microns.

When the undrawn sheet obtained by the process of the invention is drawn as above, there is obtained a drawn sheet of the polyamide material having an even thickness and a high transparency. It is particularly notable that sequential biaxial stretching, which has been carried out only with great difficulty, can be successfully accomplished without any difficulty.

Explaining a typical example of the process of the invention with reference to FIG. 2 of the accompanying drawings, the polyamide material in a melt state is extruded through a die 1 to give a sheet 2, which is quenched on the surface of a chill drum 3. A direct current of high voltage from an electric source 6 is applied to an electrode 7, from which discharge in a streamer corona state 8 is produced onto the sheet 2. The chilled undrawn sheet 5 goes over a roll 4 to a drawing apparatus 9 and then to another drawing apparatus 10. Finally, the drawn sheet is taken up in a take-up apparatus 11.

Practical and presently preferred embodiments of the present invention are shown in the following Examples wherein measurement of the physical properties was carried out in the following manner:

(1) Haze: determined according to the method as described in ASTM (American Society for Testing and Materials) D1003-61.

(2) Variation in thickness: determined by measuring the maximum and minimum thicknesses in the 5 m length of the machine direction using a thickness measuring apparatus of continuous contact type (manufactured by Anritsu Denki K.K.) and calculating the variation rate according to the following equation:

$$\text{Variation in thickness (\%)} = \frac{\text{Maximum thickness} - \text{Minimum thickness}}{\text{Thickness in average}} \times 100$$

(3) Specific gravity: determined according to the method as described in ASTM D1505-63T.

(4) Crystallinity: determined by the calculation according to the following equation:

$$\alpha\ (\%) = \frac{da - d}{da - dc} \times \frac{dc}{d} \times 100$$

wherein d is the density of the tested film (g/cm$^3$), da is the density of the non-crystalline portion (da of nylon 6, 1.113; da of nylon 66, 1.09), dc is the density of the crystalline portion (dc of nylon 6, 1.212; dc of nylon 66, 1.24) and $\alpha$ is the crystallinity.

EXAMPLE 1

In a per se conventional procedure, ε-caprolactam was subjected to polymerization, whereby nylon 6 (Tc=185° C.) having a relative viscosity of 2.80 (determined in sulfuric acid at 25° C.) was produced. During the polymerization, silicon dioxide having an average particle size of 3 microns as a lubricant was added to the reaction system in an amount of 0.2% by weight to the weight of ε-caprolactam. The reaction mixture was dried at 100° C. in vacuo to adjust to a water content of 0.10% by weight, melted at 265° C. in a screw extruder of 90 mmφ and extruded through a die of 600 mm in width. On preparation of a sheet by the use of an apparatus as shown in FIG. 2, the extruded product was quenched on a chill roll of 30° C. and taken up at a take-up speed of 30 m/min. The obtained sheet had a thickness of about 200 microns.

For comparison, a sheet of 200 microns thick was prepared without application of any electric load. Another sheet of 200 microns thick was also prepared by a conventional electrostatic pinning procedure. An electric source having a ripple of not more than 0.5% was used as a direct current high voltage electric source.

On the above prepared sheets, the state of contact onto the chill roll, the haze, the crystallinity, etc. were measured, and the results are shown in Table 1.

TABLE 1

|  | Example | | Comparative Example | | | | | |
|---|---|---|---|---|---|---|---|---|
|  | 1-1 | 1-2 | 1-1 | 1-2 | 1-3 | 1-4 | 1-5 | 1-6 |
| Shape of electrode | 0.5 mmφ Multiple needles | 0.5 mmφ Multiple needles | None | 0.5 mmφ Wire | 10 mmφ Round rod | 5 mmSquare Square rod | Knife edge | 0.5 mmφ Wire |
| State of discharge | Streamer corona | Streamer corona | — | Glow corona | Not seen | Not seen | Not seen | Glow corona |

TABLE 1-continued

|  | Example | | Comparative Example | | | | | |
| --- | --- | --- | --- | --- | --- | --- | --- | --- |
|  | 1-1 | 1-2 | 1-1 | 1-2 | 1-3 | 1-4 | 1-5 | 1-6 |
| Voltage (KV) | −10 | +10 | — | −10 | −10 | −10 | −10 | +10 |
| Current (mA) | 15 | 10 | — | 0.52 | 0.11 | 0.12 | 0.38 | 0.80 |
| State of contact onto chill roll | Good | Good | Not good | Not good | Not good | Not good | Not good | Not good |
| Accumulation of oligomer onto chill roll | Not present | Not present | Present | Present | Present | Present | Present | Present |
| Undrawn sheet |  |  |  |  |  |  |  |  |
| Variation in thickness (%) | 3.5 | 4.0 | 12.6 | 9.8 | 10.5 | 10.3 | 9.9 | 9.6 |
| Haze (%) | 6.2 | 6.2 | 25.3*[1] | 18.2*[1] | 19.9*[1] | 20.3*[1] | 17.9*[1] | 17.8*[1] |
| Crystallinity (%) | 4.8 | 4.8 | 13.7*[2] | 11.3*[2] | 12.6*[2] | 12.5*[2] | 12.3*[2] | 11.4*[2] |

Note:
*[1] Irregularity observed on the haze of the sheet; given value indicating a maximum haze.
*[2] Irregularity observed on the crystallinity of the sheet; given value indicating a maximum crystallinity.

EXAMPLE 2

Nylon 6 having a relative viscosity of 3.00 (determined in sulfuric acid at 25° C.) and polymetaxylylene adipamide having a relative viscosity of 2.2 (determined in sulfuric acid at 25° C.) were mixed together in a weight proportion of 90:10. The resultant mixture (100 parts by weight) was admixed with silicon dioxide having an average particle size of 3 microns (0.3 part by weight) and ethylene bis(stearoamide) (0.15 part by weight). The resulting blend was melted at 265° C. in an extruder of 90 mm$\phi$ and extruded through a die of 600 mm in width. On preparation of a sheet by the use of an apparatus as shown in FIG. 2, the extruded product was quenched on a chill roll of 40° C. and taken up at a take-up speed as designed. The obtained sheet had a thickness of about 150 microns.

For comparison, a sheet of 150 microns thick was prepared by a conventional electrostatic pinning procedure.

On the above prepared sheets, the state of contact onto the chill roll, the haze, the density, etc. were measured, and the results are shown in Table 2.

TABLE 2

|  | Example | | | Comparative Example | | |
| --- | --- | --- | --- | --- | --- | --- |
|  | 2-1 | 2-2 | 2-3 | 2-1 | 2-2 | 2-3 |
| Shape of Electrode | 0.5 mm$\phi$ Multiple needles | | | 0.5 mm$\phi$ Wire | | |
| Take-up speed (m/min) | 10 | 30 | 50 | 10 | 30 | 30 |
| State of discharge | Streamer corona | | | Not seen | Not seen | Spark discharge |
| Voltage (KV) | −3 | −10 | −10.5 | −10 | −10 | −20 |
| Current (mA) | 10 | 15 | 25 | 0.60 | 0.60 | 1.5 |
| State of contact onto chill roll | Good | Good | Good | Good | Not good | Not good |
| Accumulation of oligomer onto chill roll | Not present | Not present | Not present | Not present | Present | Present |
| Undrawn sheet |  |  |  |  |  |  |
| Variation in thickness (%) | 2.8 | 3.5 | 3.6 | 2.9 | 9.9 | 11.2 |
| Haze (%) | 9.8 | 8.9 | 9.2 | 9.4 | 15.3*[1] | 16.2*[1] |
| Density (g/cm$^3$) | 1.1190 | 1.1200 | 1.1195 | 1.1202 | 1.1256*[3] | 1.1248*[3] |

Note:
*[1] observed on the haze of the sheet; given value indicating a maximum haze.
*[2] observed on the density of the sheet given value indicating a maximum density.

From the above results in Tables 1 and 2, it is understood that in order to bring a sheet of the polyamide material into close contact with the surface of a moving chill body at a high speed for rapid cooling, it is necessary to apply to the sheet a high current due to the production of streamer corona discharge.

EXAMPLE 3

The undrawn sheet obtained in Example 1 was drawn 3.5 folds in a machine direction by the use of a roll drawing machine at 60° C. to give a drawn sheet of about 60 microns thick.

The draw property on the drawing and the variation in thickness and the haze of the drawn sheet were measured, and the results are shown in Table 3.

TABLE 3

|  | Example | | Comparative Example | | | | | |
| --- | --- | --- | --- | --- | --- | --- | --- | --- |
|  | 1-1 | 1-2 | 1-1 | 1-2 | 1-3 | 1-4 | 1-5 | 1-6 |
| Undrawn Sheet |  |  |  |  |  |  |  |  |
| Draw Property Drawn Sheet | Good | Good | Bad | Not good | Not good | Not good | Not good | Not good |
| Variation in thickness (%) | 3.8 | 5.0 | — | 10.5 | 12.1 | 12.1 | 11.2 | 9.8 |
| Haze (%) | 2.2 | 2.3 | — | 6.0 | 6.5 | 6.7 | 5.9 | 6.0 |

EXAMPLE 4

The undrawn sheet obtained in Example 2 was drawn 3.5 folds in a machine direction by the use of a roll drawing machine at 70° C. and then 3.7 folds in a transverse direction in a tenter at 100° C., followed by heat fixation at 200° C. under a relaxation of 5% in a transverse direction.

The draw property on the drawing and the variation in thickness and the haze of the drawn sheet were measured, and the results are shown in Table 4.

TABLE 4

|  | Example | | | Comparative Example | | |
|---|---|---|---|---|---|---|
|  | 2-1 | 2-2 | 2-3 | 2-1 | 2-2 | 2-3 |
| Undrawn sheet | | | | | | |
| Draw property | | | | | | |
| MD | Good | Good | Good | Good | Not good | Not good |
| TD | Good | Good | Good | Good | Bad | Bad |
| Drawn sheet | | | | | | |
| Variation in thickness (%) | 3.2 | 3.7 | 3.8 | 3.1 | — | — |
| Haze (%) | 1.5 | 1.4 | 1.4 | 1.5 | — | — |

From the above results in Tables 1 to 4, it is understood that a sheet of the polyamide material can be prepared and drawn with a high speed according to the process of this invention.

EXAMPLE 5

The undrawn sheet obtained in Example 1 was drawn 3 folds in a machine direction by the use of a roll drawing machine at 60° C. and then 3 folds in a transverse direction in a tenter at 100° C.

The draw property on the drawing and the variation in thickness and the haze of the drawn sheet were measured, and the results are shown in Table 5.

TABLE 5

|  | Example | | Comparative Example | | | | | |
|---|---|---|---|---|---|---|---|---|
|  | 1-1 | 1-2 | 1-1 | 1-2 | 1-3 | 1-4 | 1-5 | 1-6 |
| Undrawn sheet | | | | | | | | |
| Drawn property | | | | | | | | |
| MD | Good | Good | Breakage | Not good | Not good | Not good | Not good | Not good |
| TD | Good | Good | — | Breakage | Breakage | Breakage | Breakage | Breakage |
| Drawn sheet | | | | | | | | |
| Variation in thickness (%) | 4.5 | 5.5 | — | — | — | — | — | — |
| Haze (%) | 1.2 | 1.3 | — | — | — | — | — | — |

From the above results in Table 5, it is understood that the undrawn film of nylon 6 can be sequentially and biaxially drawn without any special drawing operation.

What is claimed is:

1. A process for production of a sheet of a polyamide material which comprises extruding the polyamide material in a melt state in the form of sheet and bringing the extruded sheet in a melt state into contact with the surface of a moving chill body for quenching to give an undrawn film, characterized in that a direct current of high voltage is applied between an electrode having discharge points arranged discontinuously and the extruded sheet so as to produce a discharge in a steamer corona state onto the extruded sheet, whereby the extruded sheet is brought into tight and close contact with the surface of the moving chill body electrically grounded so as to be chilled quickly.

2. The process according to claim 1, wherein the polyamide material comprises an aliphatic polyamide as the major component.

3. The process according to claim 2, wherein the aliphatic polyamide is nylon 6 or nylon 66.

4. The process according to claim 1, wherein the quantity of the current discharged in a streamer corona state is 10 mA to 5 A per 1 m wide of the extruded sheet.

5. The process according to claim 4, wherein the quantity of the current discharged in a streamer corona state is 20 mA to 500 mA per 1 m wide of the extruded sheet.

6. The process according to claim 1, wherein the electrode is connected to a negative terminal.

7. The process according to claim 1, wherein the extruded sheet is chilled at a temperature between 0° C. and the temperature which is 20° C. lower than the maximum temperature for crystallization.

8. The process according to claim 7, wherein the extruded sheet is chilled at a temperature of 0° C. to the glass transition temperature.

9. The process according to claim 1, wherein the undrawn sheet after chilling is drawn at least in one direction to give a drawn sheet.

10. The process according to claim 9, wherein the drawing is effected at a draw ratio of 1.1 to 8 in one direction.

11. The process according to claim 9, wherein the drawing is effected biaxially at a draw ratio of 1.1 to 6 in each of two directions.

12. The process according to claim 11, wherein the drawing is effected sequentially and biaxially.

* * * * *